United States Patent [19]

Curtis

[11] 4,064,316

[45] Dec. 20, 1977

[54] PROCESS OF DENATURING LEAD PAINTED SURFACES

[75] Inventor: Thomas Haley Curtis, Lithonia, Ga.

[73] Assignee: Camco Paints, Inc., Decatur, Ga.

[21] Appl. No.: 652,163

[22] Filed: Jan. 26, 1976

[51] Int. Cl.$^2$ .............................................. B32B 9/00
[52] U.S. Cl. ....................................... 428/522; 424/2; 424/195; 428/411; 428/907
[58] Field of Search ............... 47/57.6, 58, ; 424/195, 424/310, 2; 428/411, 907, 522

[56] References Cited

U.S. PATENT DOCUMENTS

| 631,738 | 8/1899 | Dowie et al. | 424/195 X |
|---|---|---|---|
| 3,663,253 | 5/1972 | Stone | 424/195 X |
| 3,935,137 | 1/1976 | Minkoff | 260/17 R |

*Primary Examiner*—George F. Lesmes
*Assistant Examiner*—Henry F. Epstein
*Attorney, Agent, or Firm*—Harold L. Marquis

[57] ABSTRACT

A process of denaturing a lead painted surface by coating such surface with a paint containing from 0.001% to 0.5% by weight benzyldiethyl (2,6-xylylcarbamoyl methyl) ammonium benzoate and from 0.01 % to 2.0 % by weight of pepper extract.

3 Claims, No Drawings

PROCESS OF DENATURING LEAD PAINTED SURFACES

BACKGROUND OF THE INVENTION

It is well known that the repetitive ingestion of lead-base paints by children may produce lead poisoning, which may be fatal. Even the ingestion of small amounts of lead may result in subclinical damage to the bones and other organs. The surfaces of the walls and ceilings of many older residences carry a heavy accumulation of the old lead paints. The thickness and age of the paint accumulation results in paint chips and flakes being readily available to children. Children are attracted to eating these lead base paint chips, and flakes by the sweet taste imparted by the lead.

Although the strict governmental restrictions on the lead content of new paints reduce the hazard of lead poisoning from new construction, the restrictions do not significantly reduce the hazard presented by lead-base paints that have been applied in the past. Applying a lead free paint to a surface with a heavy accumulation of lead-base paint does not prevent chipping and flaking of the paint accumulation. Once a child has accidentally tasted a sweet lead paint chip, he may chip the paint himself to satisfy his palate. It is very expensive and time consuming to remove the accumulation prior to repainting. If the lead paint accumulation could be easily rendered unpalatable, the probability of ingestion by children would be nearly eliminated.

OBJECTS OF THE PRESENT INVENTION

The principal object of this invention is to develop a process to render a lead painted surface unpalatable to humans. It is a further object to render such surface unpalatable for an extended period of use and periodic cleaning. Such process must not present any toxicity hazard.

DESCRIPTION OF INVENTION

I have discovered a process for denaturing lead painted surfaces to render them unpalatable to humans. I have discovered that coating the surface with a paint containing benzyldiethyl (2,6xylylcarbamoyl methyl) ammonium benzoate (denatonium benzoate N.F.) and a pepper extract renders the surface unpalatable to almost all children. Denatonium benzoate has an extremely bitter taste.

While denatonium benzoate produces a very bitter taste, sensitivity to bitter oral sensations is weak or absent in approximately thirty percent of the population. Consequently, merely adding this compound to a paint would not be effective in deterring a large number of children from eating chips. I have also discovered that adding a pepper extract to the paint will repel most of the people who are not deterred by the denatonium benzoate.

The pepper extract may be from a red, white or black pepper. Among these extracts are oil of pepper, oleo-resin capsicum, fluid extract capsicum and oleo-resin black pepper. Oleo-resin capsicum is the preferred additive.

The denatonium benzoate and pepper extract can simply be mixed into any conventional paint. A water-base paint is preferred to a solvent paint because the bitter and peppery tastes are not released quickly enough from the solvent paint. It is important that the paint have good adhesion qualities so that all of the lead surface is coated. It is also important that the paint be washable and the denatonium benzoate and pepper extract are not removed by washing. It has been found that a 60% epoxy resin emulsion insures adhesion and washability. The preferred paint is based upon a 55% vinyl acetate-acrylic copolymer emulsion (latex paint). The formulation set forth in Example 1 is preferred for commercial utilization.

From 0.001% to 0.5% by weight of denatonium benzoate must be added to the paint to impart a sufficiently bitter taste. Preferably, from 0.005% to 0.1% of denatonium benzoate is added with 0.05% being the optimum amount. From 0.01% to 2.0% of pepper extract may be added to the paint. Preferably from 0.05% to 0.5% pepper extract is added. The optimum amount is approximately 0.1% pepper extract.

The denatonium benzoate and pepper extract not only render the paint unpalatable, but render any accumulation of lead paint to which it is applied unpalatable. The lead paint is not only coated with an unpalatable paint, but some of the denatonium benzoate and pepper extract is absorbed by the lead paint which provides additional protection against ingestion in case the coating separates from the lead paint chip.

The paint can be applied by any conventional means, such as brushing, rolling or spraying, to the surface to be painted. It is important that loose chips and flakes be removed before painting to insure that all the surface is well coated to reduce the hazard of ingestion of lead paint chips.

The following example illustrates the denaturing of a latex enamel with the denatonium benzoate and pepper extract.

EXAMPLE 1

A latex enamel was prepared by mixing the following ingredients together on a high speed blender in the proportions stated:

| Ingredient | Percentage |
| --- | --- |
| Titanium dioxide | 16.9 |
| Calcium carbonate | 13.7 |
| 55% polyvinyl acetate-acrylic copolymer emulsion | 29.6 |
| Hydroxypropyl methyl cellulose | 0.55 |
| Surfactants and dispersants | 1.93 |
| Denatonium benzoate | 0.05 |
| Oleoresin capsicum | 0.09 |
| 60% epoxy ester emulsion | 1.55 |
| Ethylene glycol | 3.65 |
| 1-(3-chloroallyl)-3,5,7,-triaza-1-azonia-adamantane chloride as a preservative | 0.18 |
| 6% manganese and 6% cobalt (driers) | 0.04 |
| Commercial defoamers | 0.82 |
| Water | Balance |
| Total | 100.00 |

An interior surface with a heavy accumulation of lead-base paints was prepared for painting by scraping off any loose flakes and chips. The surface was then painted by brush with one coat of this latex enamel. The enamel retained its bitter-peppery taste after 5,000 washing strokes with an aqueous solution of dishwasing liquid.

I claim:

1. A process of deterring humans from ingesting lead-base paint chips from interior surfaces with an accumulation of lead paint which comprises coating such surface with a vinyl acetate-acrylic copolymer emulsion water base paint containing a deterrent which consists of from 0.001% to 0.5% by weight benzyldiethyl (2,6-xylylcarbamoyl methyl) ammonium benzoate and from 0.01% to 2.0% by weight pepper extract.

2. The process of claim 1 in which the pepper extract is oleoresin capsicum.

3. The process of claim 2 in which the benzyldiethyl (2,6-xylylcarbamoyl methyl) ammonium benzoate is present in an amount from 0.005% to 0.1% by weight and the oleoresin capsicum is present in an amount from 0.05% to 0.5% by weight.

* * * * *